United States Patent
Ames et al.

(10) Patent No.: US 9,739,400 B2
(45) Date of Patent: Aug. 22, 2017

(54) COUPLING FOR CONNECTING TUBULAR ELEMENTS FOR BOTTOM-HOLE ASSEMBLIES

(75) Inventors: Jochen Peter Ames, Belo Horizonte (BR); Alexandre Vieira Cardoso, Belo Horizonte (BR); Julio Cesar Da Silva, Contagem (BR)

(73) Assignee: VALLOUREC OIL AND GAS FRANCE, Aulnoye-Aymeries (FR)

( * ) Notice: Subject to any disclaimer, the term of this patent is extended or adjusted under 35 U.S.C. 154(b) by 909 days.

(21) Appl. No.: 14/008,970

(22) PCT Filed: May 3, 2012

(86) PCT No.: PCT/EP2012/058141
§ 371 (c)(1),
(2), (4) Date: Sep. 30, 2013

(87) PCT Pub. No.: WO2012/152657
PCT Pub. Date: Nov. 15, 2012

(65) Prior Publication Data
US 2014/0054891 A1    Feb. 27, 2014

(30) Foreign Application Priority Data

May 6, 2011  (BR) .................................. 1102442
Aug. 1, 2011  (EP) .................................. 11290352

(51) Int. Cl.
*F16L 35/00*    (2006.01)
*F16L 15/08*    (2006.01)
(Continued)

(52) U.S. Cl.
CPC .............. *F16L 15/08* (2013.01); *E21B 17/02* (2013.01); *F16L 15/002* (2013.01); *F16L 15/004* (2013.01); *F16L 2201/60* (2013.01)

(58) Field of Classification Search
CPC ....... F16L 18/08; F16L 15/002; F16L 15/004; F16L 2201/60; E21B 17/02
(Continued)

(56) References Cited

U.S. PATENT DOCUMENTS 1,849,066 A * 3/1932 Bridges ............... E21B 17/0426
                                                285/334
1,889,868 A * 12/1932 Montgomery ........ E21B 17/042
                                                285/333 X
(Continued)

FOREIGN PATENT DOCUMENTS

CN  201715129 U  1/2011
EP  1 020 674     7/2000
(Continued)

OTHER PUBLICATIONS

International Search Report Issued Jul. 12, 2012 in PCT/EP12/058141 Filed May 3, 2012.

*Primary Examiner* — Gregory Binda
(74) *Attorney, Agent, or Firm* — Oblon, McClelland, Maier & Neustadt, L.L.P.

(57) ABSTRACT

A coupling including a tubular body with two ends of the body each including a portion of internal threading for joining to a tubular element, and a central portion separating the two ends each including a portion of threading and having a wall thickness greater than the wall thickness of the ends of the body. The coupling includes an extension segment that extends from one of the ends of the tubular body, after the portion of internal threading, the extension segment having same outside diameter as that of the tubular body and an inside diameter greater than or equal to that of the portion of internal threading. Moreover, the extension segment includes a housing, including an opening onto an (Continued)

external surface of the coupling, in which an electronically responsive identification tag is housed.

12 Claims, 4 Drawing Sheets

(51) Int. Cl.
*E21B 17/02* (2006.01)
*F16L 15/00* (2006.01)

(58) Field of Classification Search
USPC .......................... 285/333–334, 355, 390, 93
See application file for complete search history.

(56) References Cited

U.S. PATENT DOCUMENTS

| | | | | |
|---|---|---|---|---|
| 2,118,350 | A | * | 5/1938 | Holt ...................... E21B 17/043 |
| | | | | 285/333 |
| 4,202,490 | A | | 5/1980 | Gunkel et al. |
| 5,713,423 | A | * | 2/1998 | Martin ...................... F16L 9/18 |
| 6,206,436 | B1 | | 3/2001 | Mallis |
| 6,333,699 | B1 | * | 12/2001 | Zierolf .................. E21B 17/006 |
| 6,454,315 | B1 | | 9/2002 | Yamaguchi |
| 6,811,187 | B2 | * | 11/2004 | Otten .................... E21B 17/006 |
| | | | | 285/93 X |
| 6,989,764 | B2 | * | 1/2006 | Thomeer ................. E21B 23/00 |
| | | | | 166/250.01 |
| 7,159,654 | B2 | | 1/2007 | Ellison et al. |
| 7,474,221 | B2 | * | 1/2009 | Den Boer ............. E21B 17/006 |
| 2002/0014966 | A1 | | 2/2002 | Strassner, II et al. |
| 2002/0035448 | A1 | | 3/2002 | Denny et al. |
| 2002/0158120 | A1 | | 10/2002 | Zierolf |
| 2004/0217880 | A1 | | 11/2004 | Clark et al. |
| 2005/0230109 | A1 | | 10/2005 | Kammann et al. |
| 2006/0175404 | A1 | | 8/2006 | Zierolf |
| 2008/0165011 | A1 | | 7/2008 | Staff |
| 2010/0171593 | A1 | | 7/2010 | Zierolf |

FOREIGN PATENT DOCUMENTS

| | | |
|---|---|---|
| GB | 2 401 187 | 11/2004 |
| JP | 57-184196 U | 11/1982 |
| JP | 5-296368 A | 11/1993 |
| JP | 8-502571 A | 3/1996 |
| JP | 10-89554 A | 4/1998 |
| WO | WO 94/08278 A1 | 4/1994 |
| WO | WO 2005/010073 A1 | 2/2005 |
| WO | 2006 041306 | 4/2006 |

* cited by examiner

COUPLING FOR CONNECTING TUBULAR ELEMENTS FOR BOTTOM-HOLE ASSEMBLIES

The present invention relates to a coupling for thin-walled tubes used in activities of construction, operation and maintenance of onshore or offshore oil exploration wells, as well as oil and gas production from these wells. In this case, the threaded tubular connection generally comprises a male threaded element at the end of a great-length tube and a female threaded element at the end of a tube of smaller length denoted by the term "coupling".

The present invention also relates to threaded tubular connections comprising a male threaded element at the end of a first great-length tube and a female threaded element at the end of a second great-length tube. These connections formed by joining two great-length tubes, and not as in the above-mentioned case, a great-length tube and a coupling, are generally called "integral connections".

DESCRIPTION OF THE STATE OF THE ART

The operations carried out in an oil well before the start of oil and gas production require a large number of items of equipment and materials. Until they arrive at their destination, as well as during their storage, installation, dismantling and subsequent maintenance, these items, such as tubes, coatings, seals, coupling sleeves, valves and others, must be handled a great many times. However, it is very important always to have the right quantity of equipment available in order to avoid interruptions, which cause vast expense associated with the high operating costs of oil wells.

In service, these components, and especially the coupling sleeves, are subjected to considerable stresses, which can lead to serious damage and cracking of the equipment, through distortion, wear or fatigue. A fatigue crack on a coupling sleeve, for example, can lead to complete paralysis of the well operations. It should be pointed out that such an incident and the work that it entails for repairing the equipment give rise to vast expense, inherent in any oil well downtime.

These components are associated with high cost, linked to the large quantity of material used in their manufacture, their complex manufacturing processes, and the high quality requirements that they must satisfy so that they can withstand the service stresses and avoid losses associated with failure in service. Consequently, these high component costs justify their maintenance and repair to permit subsequent reuse. In particular, the steel used in the manufacture of couplings and tubes can generally be reused. The tubes and couplings are repaired several times and reused directly after dismantling from the string or are returned to their manufacturers for recycling, reducing unnecessary expenditure on raw materials.

Accordingly, it is desirable to have a permanent record of the tubes and couplings that are installed in a string, containing, for example, identification of the manufacturer, of the material, and other characteristics of the components, which can be determined again after dismantling the string. The record can also be used in addition for storing information relating to the duration of use in order to permit monitoring of fatigue and of other factors associated with the usage of the equipment.

Identification of the characteristics and properties of tubes and couplings is also important during storage and transport of the equipment, so that each type of article can be located quickly, and reliably identified.

Nowadays, it is conventional in industrial procedures to identify tubes and other OCTG equipment by marking the most important information on the body of the tube, several times depending on the specific standards of the product. However, this type of marking is easily damaged and wears away during transport, handling, storage and prolonged use of the tube. This is due in particular to abrasive physical contact, to heat and to corrosion. Since it does not have any kind of protection, marking with ink can also be erased by any unauthorized third party.

Identification tags, which are electronically responsive (accessible by electromagnetic waves, for example), can be used for storing component characteristics digitally for a long period. However, application of a tag of this type to tubes and couplings in such a way that it can withstand the severe conditions to which the tubes are subjected for several years, of high pressure and temperature, corrosive environment, abrasion and impact, is relatively complex to achieve.

Certain types of tube, such as casing pipes and tubing, have very small wall thicknesses, typically between about 4 and 25 mm, and most often between 4 and 20 mm, and are designed for final installation inside another tubing string. Thus, any additional material or component applied on the external surface of these tubes increases the outside diameter, which can lead to difficulties or even make it impossible to install the tubes within the string provided for this purpose.

Moreover, it is not possible to reduce the already small thickness of tubes of this type by attaching an identifying element in a slot on its external or internal surface, as this would affect the structural strength of the tube and would thus increase the risk of cracking and damage.

The application of RFID (Radio Frequency IDentification) tags on tubes and components used in drill strings is already known in the prior art. Document US2002/0014966, for example, refers to an identification tag that can be fixed to one or more components of a system for drilling oil wells. One possibility is to integrate the tag with a connecter joining two drill pipes. The tag is arranged in a hole with a depth between about 15 to 20 mm in the interior of the component of the drill string, with a protective housing and a cover that protects the tag from debris and other potential damage caused by the well drilling environment.

The connecters shown in this document comprise a central region with a larger thickness near the male threading which is connected to the female threading of the next drill pipe. The drill pipes and more particularly the connecters used for drilling have relatively larger thicknesses, with thicknesses reaching values of 50 mm or more, so that the application of a tag within a recess anywhere on the external surface does not decrease the mechanical integrity of these components significantly. Moreover, the process for making these recesses is relatively simple, because large wall thicknesses do not require a really accurate operation of boring or machining.

Document U.S. Pat. No. 7,159,654 also refers to identification of equipment in the oil and gas industry by application of RFID tags on the external surface of components. Various means for application of tags on a tube, for example, are presented, including insertion in recesses made in the shoulder near the male threadings at the end of the tube or in the central portion of the connecter with larger wall thicknesses or screwed or glued on the external surface of the drill pipes. The solutions shown do not take into account preservation of the outside diameter or adaptation to thin-walled components, such as casing pipes for example, because they do not affect the mechanical integrity of the tubes.

Document US2002/0035448 describes a system for identification of OCTG equipment based on an RFID tag within a protective housing. This housing can be inserted in a recess made on the external surface. Just as before, this solution cannot be applied on thin-walled components, since such recesses lower the mechanical strength.

It is also important that the components used in exploratory gas and oil wells fulfil certain requirements of sterility in order to reduce the risk of contamination of the well and obstruction of the channels and valves within the string. That is why the application of any material on the internal or external surface should be avoided, unless there would not be any risk that the additional material could be scraped off or peeled off.

Document WO200510073, for example, proposes applying an RFID tag on the external surface of a tubular structure, and protecting the tag by depositing a series of layers of heat-resistant material on the tag. Apart from the fact that this type of heat protection only makes it possible to delay the effect of high temperatures but proves ineffective for protecting sensitive electronic components over a prolonged period, the material poses a risk of contamination of the well and consequently is unsuitable for the identification of pipes conveying gas and oil.

It may therefore be said that none of the techniques already known can provide effective, durable marking that does not cause structural damage to thin-walled tubes or does not present a risk of contamination of the well.

AIMS OF THE INVENTION

A first aim of the invention is to provide a tubular structure with an electronically responsive identification tag that can withstand several years of service under the usual conditions of use in oil wells, which is resistant to handling, transport, storage and assembly of strings, and which does not compromise the mechanical integrity of thin-walled tubes or does not present a risk of contamination of the well.

A further aim of the invention is to provide a tubular structure equipped with an electronically responsive identification tag which is easy to apply, without adversely affecting the productivity of the production process or its applicability.

Another aim of the invention is that the electronically responsive identification tag in the tubular structure should allow easy reading of all the information contained using ready-to-use devices, even under unfavourable conditions and with high tolerance to errors. Moreover, the tag should be protected against any tampering or manipulation by unauthorized third parties.

For this purpose, the invention relates to a coupling for connecting tubular elements for an oil well installation, comprising a tubular body, with two ends of the body each provided with a portion of internal threading for joining to a tubular element, the tubular body further comprising a central portion separating the two ends each provided with a portion of threading and having a wall thickness greater than the wall thickness of the ends of the body, characterized in that it comprises:

an extension segment that extends from one of the ends of the tubular body, after the portion of internal threading, said extension segment having the same outside diameter as that of the tubular body and an inside diameter greater than or equal to that of the portion of internal threading, the extension segment comprises a housing, provided with an opening onto an external surface of the coupling, in which an electronically responsive identification tag is housed.

A coupling according to the invention can further comprise one or more of the features according to which:
the extension segment forms an integral part of the tubular body of the coupling;
the extension segment is a separate component, fixed to one end of the tubular body;
the coupling comprises a second extension segment that extends from the other end of the tubular body to form a symmetrical coupling;
the housing for the electronically responsive identification tag has in addition an opening onto an internal surface of the extension segment;
the tag housing extends in a longitudinal direction of the coupling and is situated alongside the extension segment;
the coupling comprises a tubular body, with two ends of the tubular body each provided with a portion of internal threading for joining to a tubular element, the tubular body further comprising a central portion separating the two ends, with wall thickness greater than that of the ends of the body, characterized in that the central portion of the tubular body comprises a housing provided with an opening onto an external surface of the tubular body, in which an electronically responsive identification tag is housed;
the central portion of the tubular body has a length between 20 and 55 mm;
the central portion of the tubular body has a length between 55 and 100 mm;
the coupling comprises a sheath placed inside the housing, for fitting the tag;
the sheath is coupled to the housing with a tight fit;
the sheath is coupled to the housing by threading.

The invention also relates to a female threaded tubular element of a threaded tubular connection provided with a free end, the female element being delimited by an external surface and an internal surface and comprising internally a female threading formed from two zones of threading separated from one another by a shoulder, characterized in that the female element comprises a housing formed starting from its external surface and positioned roughly at the level of the shoulder between the two zones of threading.

The invention finally relates to a female threaded tubular element of a threaded tubular connection provided with a free end and comprising internally a female threading, said female threading comprising at least one zone of threading, characterized in that the female element comprises a housing formed axially beyond the zone of threading on the side opposite the free end of the female tubular element.

BRIEF DESCRIPTION OF THE DRAWINGS

Other features and advantages of the invention will become apparent from the following description given with reference to the attached drawings in which.

DETAILED DESCRIPTION OF THE FIGURES

The coupling of the present invention is used for connecting thin-walled tubes such as tubing for oil and gas production or casing pipes for the reinforcement of drilled wells. These tubes have an outside diameter of about 6 to 40.65 cm (2⅜ to 16 inches), and a wall with thickness from about 4 to 25 mm, preferably from 4 to 20 mm.

As can be seen from FIGS. 1 to 4, the identifiable coupling for joining thin-walled tubular elements for bottom-hole assemblies comprises a tubular body 1 preferably with an outside diameter that is constant along its length. Each of the two ends of the tubular body 1 is provided with a threaded internal portion 14 of the female type for coupling to other tubular elements. The tubular elements (not shown) therefore have threaded external portions, of the male type, compatible with those of the coupling, which provide reliable coupling.

According to the present invention, the tubular body of the coupling has a housing 12, in which an electronically responsive identification tag is inserted (for example, a radio frequency identification tag—known by the acronym "RFID"), which contains identifying information for the coupling and/or for the tube to which the coupling is connected.

The electronically responsive identification tag permits permanent marking of the coupling with its identifying information, which can be read after its manufacture, during transport, handling and installation up to the time when the string is dismantled, permitting reuse of these components, after recognition and optional repair of said components.

The information contained in the electronically responsive identification tag is preferably the type of article, manufacturer, standard, size, grade of steel, heat number, production batch, type of threading, date of manufacture, protection, destination and recommendations for use, among other things.

The housing must be located within a region of the tubular body with little mechanical stressing, so as not to cause a decrease in strength of the coupling and compromise its mechanical integrity. The regions with lower mechanical stressing were detected in the central portion of the coupling and in an extension segment in the ends of the coupling. The housing 12 has an opening into an external surface of the tubular body. Preferably, this housing consists of a recess in the tubular body that opens onto the external surface of the coupling, as was shown in the embodiments illustrated in FIGS. 1 and 2, so as to permit easy reading of the information contained in the electronically responsive identification tag.

The housing must have a suitable shape and dimensions, so that the electronically responsive identification tag can be housed suitably and can function appropriately.

Figure 1:
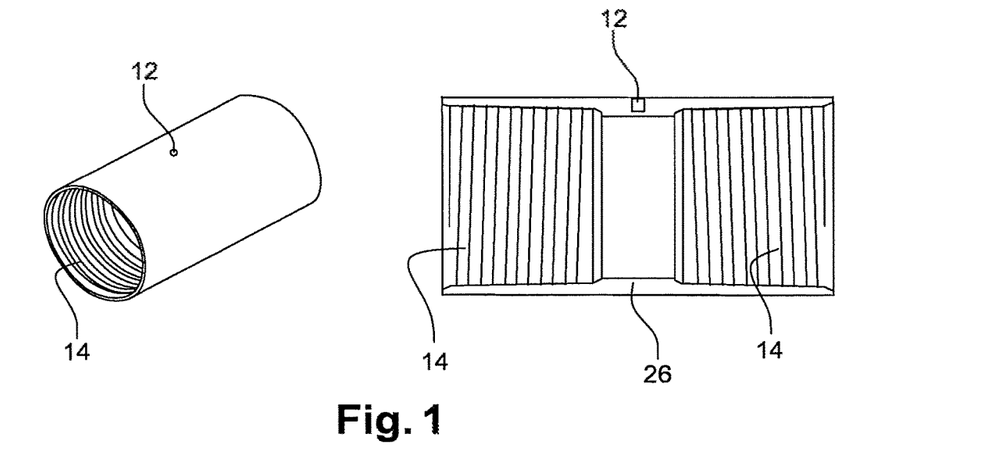
FIG. 1 shows a perspective and lateral sectional view of a coupling, according to a first embodiment of the invention, in which the electronically responsive identification tag is arranged in a central region of the coupling.
Figure 2:
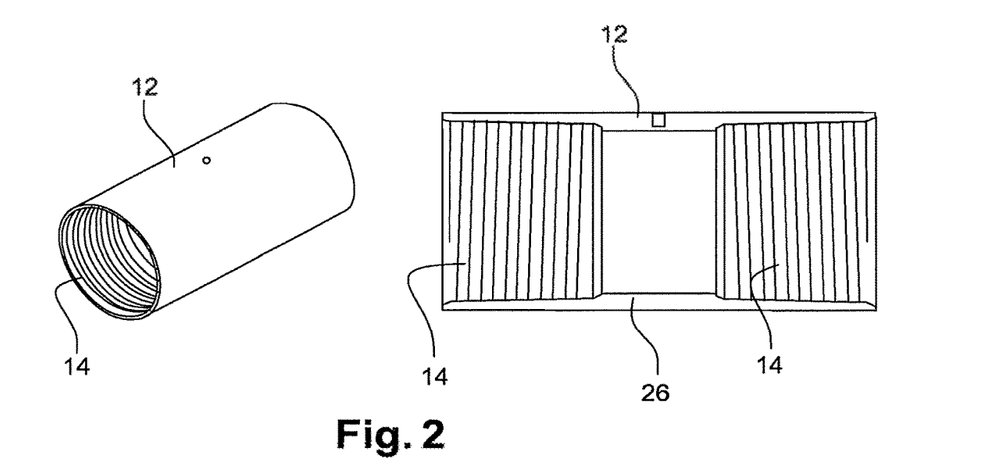
FIG. 2 shows a perspective and lateral sectional view of a coupling according to a second embodiment of the invention, in which the electronically responsive identification tag is arranged in a central region of the coupling that has an increased length.

In the embodiments illustrated in FIGS. 1 and 2, housing 12 of the electronically responsive identification tag is located in a central portion 26 of the tubular body of the coupling, between the two threaded internal portions 14 of the coupling, which is the region of the coupling of greatest thickness, and therefore of highest mechanical strength.

Depending on the size of the string and the type of connection, the wall thickness in the central zone of the coupling 16 can have values twice as large as those of the wall thickness of the respective tube connected to this coupling there. In addition and as a general rule, the outside diameter of the tubes is always smaller than the diameter of the couplings that join them together, which leads to a much smaller cross-sectional area of the tubes compared to the coupling and more particularly its central portion. Thus, cracks due to axial tensile overloading or to fatigue generally form in the zone of the first threads of the external threading of the tubes, which makes it possible to introduce a recess of a certain size in the central portion of the coupling, without weakening the assembly itself. In the coupling, the threaded portions 14 are typically those that are subjected to the highest stresses in service, so that a recess in the thicker central portion 26 of the coupling has no effect, or at least tolerable effects, on the structural integrity of the component.

Moreover, this region of larger thickness allows the recess to have a greater depth than in other regions of the coupling, and also with larger tolerances on variation of depth, which greatly simplifies the manufacturing process of the coupling including the recess. Preferably, the housing has a depth of at most 5 mm to limit the effect on mechanical strength of the coupling as far as possible.

In the embodiment of the invention illustrated in FIG. 1, housing 12 is formed in the central region 26 of the coupling, said region having dimensions normally used in couplings of this kind. According to this embodiment of the invention, the central region 26 of the coupling between the threaded portions of the ends typically has a length from 20 to 55 mm, and can vary depending on the precise size or according to the type of construction.

In the embodiment illustrated in FIG. 2, coupling 16 has a central region of coupling 16 of longer extension, compared to the coupling of the embodiment in FIG. 1, in order to provide greater tolerance around housing 12 in the form of a recess in the coupling for inserting the electronically responsive identification tag. In this embodiment, the extended central region 26 can have a length between 55 and 100 mm. This greater distance between the threaded portions 14 of the coupling, forming a longer central region 26, permits a design that is resistant to fatigue, with gentler radii, thus reducing the effects of stress concentration. In that way, the effect of the recess on the mechanical strength of the assembly of the coupling with the tubes is reduced and/or means that more space is available for inserting an electronically responsive identification tag that has a wider reading band because of the larger antenna.

Figure 3:
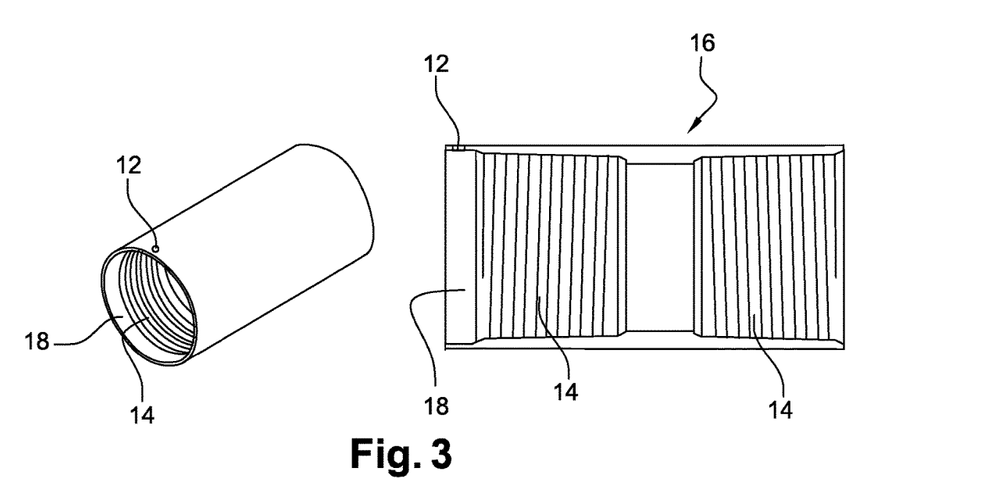
FIG. 3 shows a perspective and lateral sectional view of a coupling according to a third embodiment of the invention, in which the electronically responsive identification tag is incorporated in an additional tubular region extending from one side of the coupling and consequently asymmetric.
Figure 4:
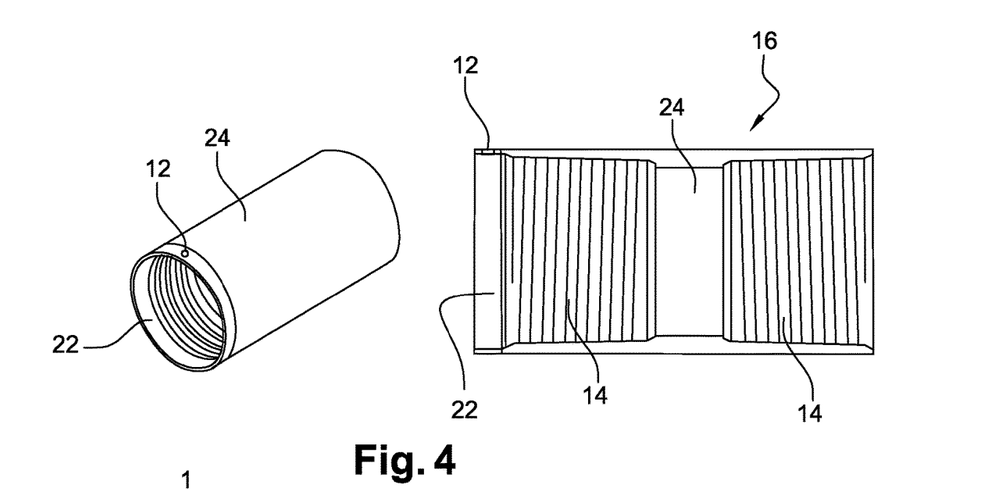
FIG. 4 shows a perspective and lateral sectional view of a coupling according to a fourth embodiment of the invention, in which the electronically responsive identification tag is incorporated in a separate additional tubular region connected to one side of the coupling.
Figures 6, 7:
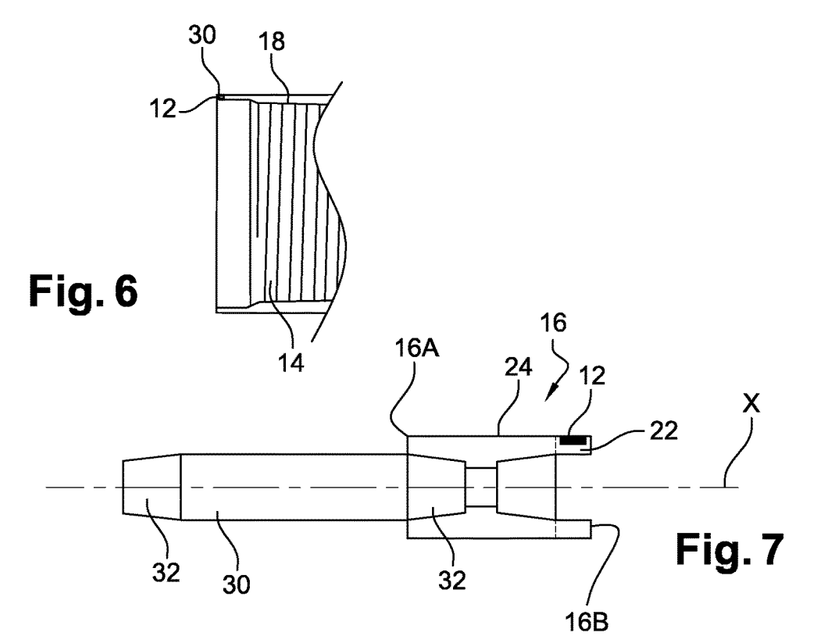
FIG. 6 shows a cross-sectional view of a coupling according to a fifth embodiment of the invention, in which the electronically responsive identification tag is arranged on an extension segment formed by a separate component connected to one end of the tubular body, the tag housing being oriented in the longitudinal direction of the coupling.
FIGS. 7 and 8 are schematic cross-sectional views of the coupling depicted in FIG. 3 when the latter is connected to a tube provided with a male end according to two different configurations.

In the embodiments illustrated in FIGS. 3, 4 and 6, the coupling comprises an additional extension segment 18 or 22, which must have the same diameter as the coupling itself so as not to increase the outside diameter of the coupling.

The extension segment 18, 22 extends from one end of the coupling, after the portion of internal threading 14, creating an asymmetric coupling with a greater length compared to the coupling of the embodiment illustrated in FIG. 1.

The extension segment 18, 22 has an inside diameter greater than or equal to that of the portion of internal threading 14, to avoid any interference during connection of the tubular elements to the coupling.

Preferably, the extension segment 18, 22 does not have internal threading in order to give a small distance relative to the tube connected to it as well as to its male external threaded surface.

This arrangement provides easier manufacture of this portion of the coupling, by means of a well-defined, fully usable thickness of the extension segment without complete or incomplete threading on the inside. Moreover, this configuration also allows interference to be avoided and offers some space on the inside of the coupling, which can be useful for fixing the identification tag. Finally, the extension segment serves as protection for an annular zone of the tube connected to the coupling against mechanical impacts, which can then be used for applying a surface marking, by micro-percussion or laser, for example, referring to the tube and to the coupling.

In the embodiments in FIGS. 3, 4, and 6, the tag housing 12 is located in the extension segment 18, 22, which is a region that is free from mechanical loading. Consequently, the introduction of the housing 12 in this zone does not have an adverse effect on the performance of the coupling.

In the embodiments in FIGS. 3 and 4, the tag housing 12 is oriented in the radial direction of the coupling and preferably has an opening into an internal surface of the tubular body as well as the opening in the external surface of the tubular body, creating a hole through the wall of the extension segment 18, 22. This arrangement is advantageous as it simplifies the manufacturing process of the coupling, since to make a hole that opens into this extension segment 18, 22 calls for much lower precision than making a recess with a precisely defined depth, which is the case in the embodiments shown in FIGS. 1 and 2.

In the embodiment of the invention illustrated in FIG. 3, the extension segment 18 is formed as an integral part of the tubular body, from the manufacture stage of this component, which must be considered from the cutting stage of the raw material. In the embodiment illustrated in FIG. 4, the extension segment 22 is formed by a separate component, which is then fixed to one end of the tubular body of the coupling, for example by welding, by gluing, by threading, by a positive fit, etc.

Figure 8:
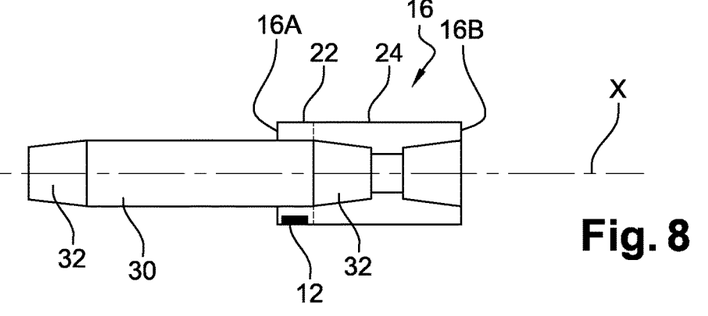

FIG. 7 or FIG. 8 shows a component comprising the coupling 16 illustrated in FIG. 3 and a tube 30 provided at one of its ends, a male threaded element 32 inserted and screwed inside the coupling 16. Such a component is intended to be connected directly to a tubing string already in place in a well. Preferably, as shown in FIG. 8, the tubular extension segment 22 is formed at the end 16A of coupling 16 and extends towards the male threaded element 32 of tube 30. This makes it possible to protect the extension segment from impacts and shock during handling, transport and positioning of the assembly on the rest of the string already in place.

Figure 9:
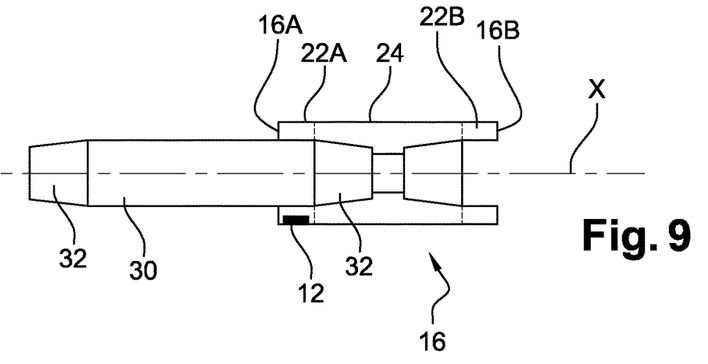
FIG. 9 illustrates a variant embodiment of the coupling in FIGS. 7 and 8 in which the coupling comprises tubular extension segments at its two ends to form a symmetrical coupling.

As a variant, as shown in FIG. 9, coupling 16 is provided at both ends 16A, 16B with a tubular extension segment referenced 22A, 22B respectively, to form a symmetrical coupling 16. This makes it possible to simplify the manufacture of such a coupling as well as its handling, relative to the manufacture of the asymmetric coupling 16 in FIGS. 7 and 8. In this case, preferably, housing 12 is formed in the extension segment 22A of the end of the coupling facing tube 30.

In the embodiment shown in FIG. 6, housing 12 is configured as a recess oriented in the longitudinal direction of the coupling and is located at the edge 30 of the extension segment 18 which forms an integral part of the coupling. The housing is open on the surface of edge 30 of the extension segment 18, which also forms part of the external surface of the coupling. Still according to the invention, a housing oriented longitudinally can also be applied to an extension segment 22 (embodiment not shown) of the type formed as a separate component of the coupling, which is attached to the latter subsequently. In this case, the housing must be located in the end of the extension segment 22 opposite the side with connection of the extension segment to the coupling.

Figure 5:
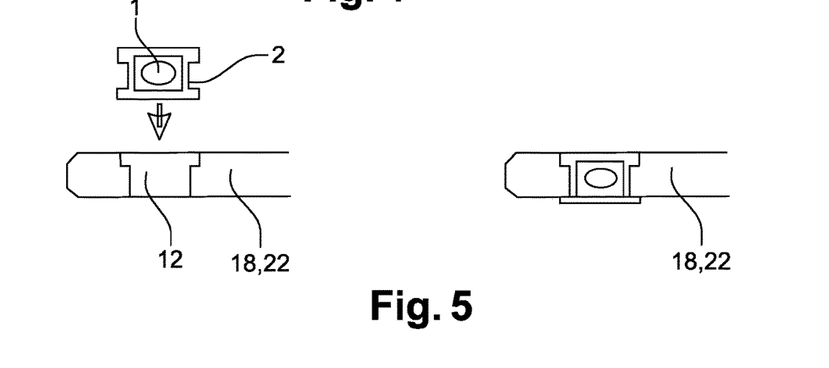
FIG. 5 shows a detailed sectional view of the electronically responsive identification tag fitted inside a separate sheath that is installed on the coupling with a tight fit.

The coupling according to the present invention can further contain a sheath 2 in the form of a separate component for housing the tag 1, as was shown in FIG. 5. The sheath can be formed of any type of plastic material. The tag is arranged inside the sheath 2, which is then coupled in housing 12 in the form of a through-hole, preferably with a tight fit, by threading (not shown), by gluing, by welding, by positive fit, by clipping, etc. Any of these fixing means can be used in the case when the housing is formed from a through-hole (FIGS. 3 and 4) or in the case when the housing is a recess formed in the wall of the coupling (FIGS. 1 and 2). Other means of fixing the sheath can be used while remaining within the scope of the invention. The advantage of using a sheath 2 for the tag is that it permits easy assembly, which can optionally even be done manually.

In all the embodiments described, accurate fitting of the sheath 2 in housing 12 or filling of the empty space between the housing and the electronically responsive identification tag is very important for preventing corrosion-related cracking. This type of corrosion is defined in the literature "ASM Handbook" as corrosion of the differential aeration cell type, caused by the accumulation of moisture, wet particles, mud, sand or stagnant fluids that can occur in narrow openings or spaces between components, metal with metal or nonmetal with metal. This is very important, since, once the tubes are inserted in casing strings or tubing strings, and for example unlike drill pipes, they remain under unfavourable conditions for a long period of time without any possibility of inspection or maintenance.

FIG. 5 shows a configuration of the sheath 2 of the coupling according to the invention. As can be seen from this figure, the sheath 2 has a cylindrical profile with top and bottom edges that extend beyond the cylindrical central region, and have a larger diameter than the central region of the sheath. This sheath can be closed at its top and bottom ends, so that the electronically responsive identification tag remains isolated and protected within it.

In this embodiment of the invention, the tag housing 12 is in the form of a through-hole with a central portion having an inside diameter compatible with an outside diameter of the sheath, to permit fitting adjusted to the interior of the housing 12. The top edge of housing 12 has a larger diameter than its central region, with dimensions compatible with those of the top edge of the sheath 2, to provide a tight fit of the sheath in the housing. Thus, at the time of assembly of the coupling, the sheath 2 of the tag rests on housing 12 and is pressed into the housing, towards the interior of the tubular body, until it is completely fitted inside housing 12. The bottom edge of the sheath of larger diameter fits on the outside of the opening of the housing facing the internal surface of the coupling, ensuring a tight pressure fit of the sheath in the housing.

Other arrangements and shapes of housings and tags are conceivable, as shown in FIG. 12 and FIGS. 13A to 13C.

Figures 11, 12:
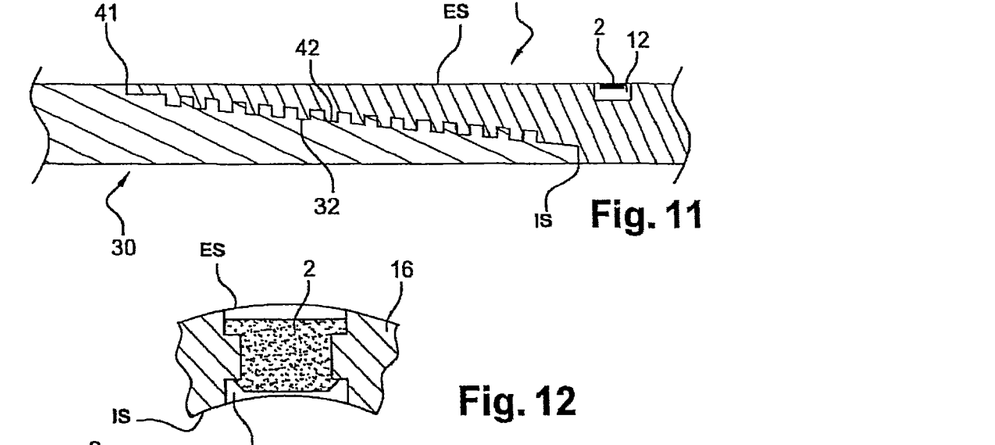
FIG. 11 shows a sectional view of a threaded connection of the integral type according to the invention comprising a single-stage zone of threading.
FIGS. 12, 13A to 13C are enlarged views illustrating different configurations of incorporation of a tag in a housing.

Thus, FIG. 12 shows a housing 12 and a tag 1 incorporated in a sheath 2 in a configuration such that sheath 2 can be snap-fitted into housing 12. The housing is for example formed by a hole passing through the thickness of the coupling 16.

Figure 13A:
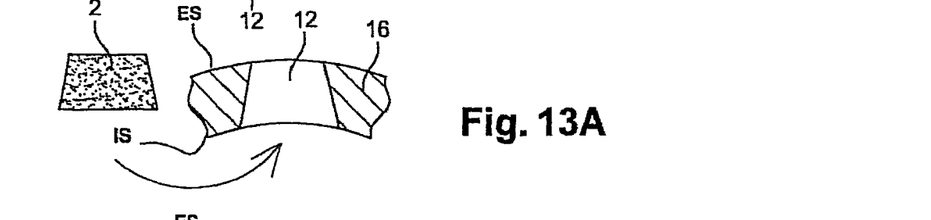
Figure 13B:
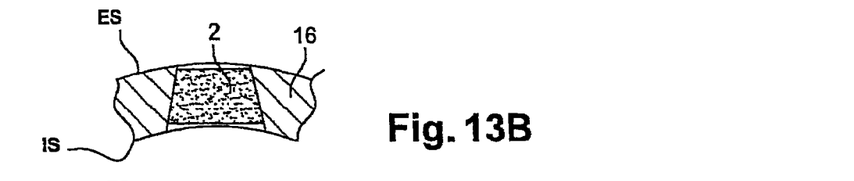
Figure 13C:
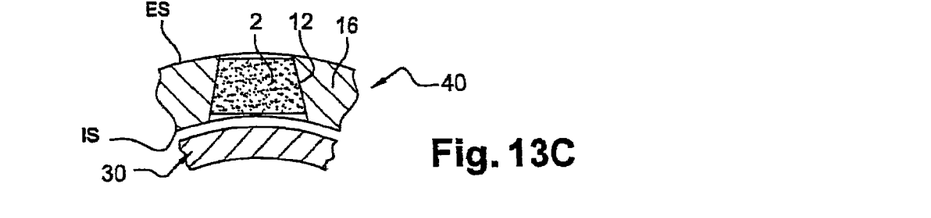

In the variant shown in FIGS. 13A to 13C, housing 12 is a hole passing through the thickness of the coupling 16 and having a narrowing of section in the direction from the external surface ES of coupling 16 to the internal surface IS of coupling 16. The tag 1 or its sheath 2 has in this case a shape complementary to the shape of housing 12. The tag 1 is then inserted in housing 12 as shown in FIG. 13B by inserting the tag from the wide end of the hole, i.e. the end opening into the coupling. Then, when coupling 16 is assembled on tube 30 provided with the male end 32, tube 30 closes the wide end of housing 12 and thus prevents tag 1 from coming out of its housing 12.

The present invention permits the application of simple methods for installing electronically responsive identification tags directly or indirectly by using plastic encapsulation without compromising the productivity of the production line. Moreover, application of the electronically responsive identification tag to the coupling instead of applying it to the tube in itself also avoids modifications of the manufacturing process of the tubes themselves.

It will be appreciated that the present invention does not apply exclusively to connections of the type of couplings 16 and tubes 30 but also to connections of the so-called "integral connection" type. This type of joint is formed by assembling a female threaded element 42 at the end of a first great-length tube 40 and a male threaded element 32 at the end of a second great-length tube 30. This type of joint therefore does not comprise a coupling.

Figure 10:
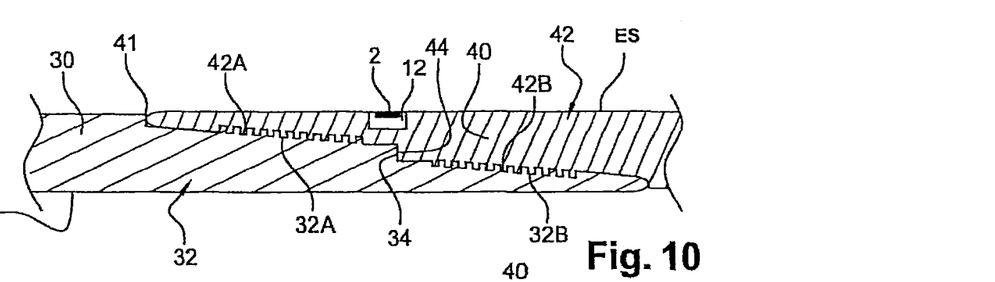
FIG. 10 shows a sectional view of a threaded connection of the integral type according to the invention comprising a two-stage threaded zone.

In the example shown in FIG. 10, the first tube 40 comprises a female threaded tubular element provided with a free end 41 and the second tube 30 comprises a male threaded tubular element for insertion in the female threaded tubular element.

The female element 40 is delimited by an external surface ES and an internal surface IS and comprises internally a female threading 42 formed from two zones of threading 42A, 42B separated from one another by a shoulder 44. The male element comprises a male threading formed from two zones of threading 32A, 32B separated from one another by a shoulder 34. The tag 1 (for example with its sheath 2) is for example incorporated in a housing 12 formed in a region of the female end 42 at the level of the separation between the two threading stages. In this case and preferably, housing 12 is formed from the external surface ES of element 40 and is positioned roughly at the level of the shoulder 44 between the two zones of threading 42A, 42B. Thus, housing 12 comprises an opening on the external surface ES of element 40 by which tag 1 can be incorporated (for example with its sheath 2).

In FIG. 11, female 42 and male 32 threaded elements only comprise one threading stage respectively. In this case, for example, tag 1 (for example with its sheath 2) is incorporated in a housing 12 formed in a region of the female end 42 located axially beyond the zone of threading starting from the free end 41, the axial direction being defined according to the axis of the tubes X.

In all the embodiments described above, the electronically responsive identification tag is applied in a housing in the wall of the coupling without affecting the outside diameter of the coupling, which is essential when considering the possibility of the coupling being used within a string which is itself screwed into another string. As the tags are installed in such a way as to be accessible via the external surface of the coupling, this arrangement makes easy reading of the information possible, by radio-frequency transmission for example, using a reader that is readily available commercially.

Furthermore, as the tags are arranged in housings in the tubular body of the coupling, they are protected against impacts resulting from handling, transport, storage and assembly of strings without compromising the mechanical integrity of the tubes and without resorting to the use of additional materials or protective layers on the tag, which eliminates the risk of contamination of the well. This arrangement of the tag in the housing of the coupling body helps to preserve the integrity of the electronically responsive identification tag up to the end of its useful life even under unfavourable conditions of oil wells.

It will be appreciated that other embodiments are conceivable while remaining within the scope of the invention. Thus, a person skilled in the art will be able to make various modifications to the invention that has just been described by way of example.

The invention claimed is:

1. A coupling for connecting tubular elements for an oil well installation, comprising:
   a tubular body, with two ends of the body each comprising a portion of internal threading to join to a tubular element, the tubular body further comprising a central portion separating the two ends each comprising a portion of threading and having a wall thickness greater than a wall thickness of the ends of the body; and
   an extension segment that extends from one of the ends of the tubular body, after the portion of internal threading, the extension segment having a same outside diameter as that of the tubular body and an inside diameter greater than or equal to that of the portion of internal threading,
   wherein the extension segment comprises a housing, comprising an opening onto an external surface of the coupling, inside which an electronically responsive identification tag is housed.

2. The coupling for connecting tubular elements according to claim 1, in which the extension segment forms an integral part of the tubular body of the coupling.

3. The coupling for connecting tubular elements according to claim 1, in which the extension segment is a separate component, fixed to one end of the tubular body.

4. The coupling according to claim 1, further comprising a second extension segment that extends from the other end of the tubular body to form a symmetrical coupling.

5. The coupling for connecting tubular elements according to claim 1, in which the housing to fit the electronically responsive identification tag also comprises an opening onto an internal surface of the extension segment.

6. The coupling for connecting tubular elements according to claim 1, in which the tag housing extends in a longitudinal direction of the coupling and is located at an edge of the extension segment.

7. The coupling for connecting tubular elements according to claim 1, further comprising a sheath placed inside the housing, for fitting the tag.

8. The coupling for connecting tubular elements according to claim 7, in which the sheath is coupled to the housing with a tight fit.

9. The coupling for connecting tubular elements according to claim 7, in which the sheath is coupled to the housing by threading.

10. The coupling for connecting tubular elements according to claim 1, wherein the extension segment is located opposite the central portion.

11. A coupling for connecting tubular elements for a bottom-hole assembly, comprising:
    a tubular body, with two ends of the tubular body each comprising a portion of internal threading to join to a tubular element, the tubular body further comprising a central portion separating the two ends, with a wall thickness greater than that of the ends of the body;
    wherein the central portion of the tubular body comprises a housing comprising an opening on an external surface of the tubular body, in which an electronically responsive identification tag is housed, and
    wherein the central portion of the tubular body has a length between 20 and 55 mm.

12. A coupling for connecting tubular elements for a bottom-hole assembly, comprising:
    a tubular body, with two ends of the tubular body each comprising a portion of internal threading to join to a tubular element, the tubular body further comprising a central portion separating the two ends, with a wall thickness greater than that of the ends of the body;
    wherein the central portion of the tubular body comprises a housing comprising an opening on an external surface of the tubular body, in which an electronically responsive identification tag is housed, and
    wherein the central portion of the tubular body has a length between 55 and 100 mm.

* * * * *